United States Patent
Boswell et al.

(10) Patent No.: US 10,296,338 B2
(45) Date of Patent: May 21, 2019

(54) SYSTEM, APPARATUS AND METHOD FOR LOW OVERHEAD CONTROL TRANSFER TO ALTERNATE ADDRESS SPACE IN A PROCESSOR

(71) Applicant: Intel Corporation, Santa Clara, CA (US)

(72) Inventors: Brent R. Boswell, Aloha, OR (US); Banu Meenakshi Nagasundaram, Hillsboro, OR (US); Michael D. Abbott, Hillsboro, OR (US); Srikanth Dakshinamoorthy, Portland, OR (US); Jason M. Howard, Portland, OR (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 15/373,668

(22) Filed: Dec. 9, 2016

(65) Prior Publication Data

US 2018/0165203 A1    Jun. 14, 2018

(51) Int. Cl.
*G06F 9/30* (2018.01)
*G06F 9/38* (2018.01)

(52) U.S. Cl.
CPC ...... *G06F 9/30101* (2013.01); *G06F 9/30189* (2013.01); *G06F 9/3802* (2013.01); *G06F 9/3881* (2013.01)

(58) Field of Classification Search
CPC ............ G06F 1/00–1/3296; G06F 3/00; G06F 3/06–3/0689; G06F 5/00–5/16; G06F 7/00–7/785; G06F 8/00–8/78; G06F 9/00–9/548; G06F 11/00–11/3696; G06F 13/00–13/4295; G06F 15/00–15/825; G06F 17/00–17/5095; G06F 19/00–19/709; G06F 21/00–21/88; G06F 12/00–12/0862; G06F 12/0864–12/1027; G06F 12/1036–12/16; G06F 2003/0691–2003/0698; G06F 2212/00–2212/7211;
(Continued)

(56) References Cited

U.S. PATENT DOCUMENTS 5,386,515 A * 1/1995 Martin ................ G06F 12/0684
710/5
5,551,006 A * 8/1996 Kulkarni ............. G06F 12/0835
711/135
(Continued)

OTHER PUBLICATIONS

Redefining the Role of the CPU in the Era of CPU-GPU Integration; Arora et al.; IEEE Micro, vol. 32, iss. 6, pp. 4-16; Aug. 13, 2012 (Year: 2012).*
(Continued)

*Primary Examiner* — Daniel C. Chappell
(74) *Attorney, Agent, or Firm* — Trop, Pruner & Hu, P.C.

(57) ABSTRACT

In one embodiment, a processor includes: an accelerator associated with a first address space; a core associated with a second address space and including an alternate address space configuration register to store configuration information to enable the core to execute instructions from the first address space; and a control logic to configure the core based in part on information in the alternate address space configuration register. Other embodiments are described and claimed.

16 Claims, 9 Drawing Sheets

(58) Field of Classification Search
CPC ............ G06F 2009/45562–2009/45595; G06F 2209/00–2209/549; G06F 2211/00–2211/902; G06F 2213/00–2213/0064; G06F 2201/00–2201/885; G06F 2205/00–2205/126; G06F 2206/00–2206/20; G06F 2207/00–2207/7295

See application file for complete search history.

(56) References Cited

U.S. PATENT DOCUMENTS

| | | | | |
|---|---|---|---|---|
| 5,953,741 A * | 9/1999 | Evoy | ........... | G06F 9/3824 711/132 |
| 6,252,612 B1 * | 6/2001 | Jeddeloh | ........... | G06F 12/0292 345/531 |
| 6,282,601 B1 * | 8/2001 | Goodman | ........... | G06F 13/24 710/260 |
| 6,418,523 B2 * | 7/2002 | Porterfield | ........... | G06F 12/1081 345/568 |
| 6,604,187 B1 * | 8/2003 | McGrath | ........... | G06F 12/1036 711/209 |
| 6,651,163 B1 * | 11/2003 | Kranich | ........... | G06F 9/3004 712/220 |
| 6,891,543 B2 * | 5/2005 | Wyatt | ........... | G06F 12/0888 345/541 |
| 6,925,547 B2 * | 8/2005 | Scott | ........... | G06F 12/1072 370/389 |
| 7,065,633 B1 * | 6/2006 | Yates, Jr. | ........... | G06F 9/30167 712/227 |
| 7,234,144 B2 * | 6/2007 | Wilt | ........... | G06F 9/3851 710/52 |
| 7,487,341 B2 * | 2/2009 | Wang | ........... | G06F 9/3009 711/202 |
| 8,719,547 B2 * | 5/2014 | Chinya | ........... | G06F 12/1027 711/200 |
| 8,788,787 B2 * | 7/2014 | Mott | ........... | G06F 12/10 711/202 |
| 8,789,169 B2 * | 7/2014 | Otani | ........... | G06F 9/30138 712/208 |
| 8,880,811 B2 * | 11/2014 | Sauermann | ........... | G06F 15/167 711/148 |
| 8,935,775 B2 * | 1/2015 | Fryman | ........... | G06F 12/14 726/17 |
| 8,938,605 B2 * | 1/2015 | Busaba | ........... | G06F 9/30174 712/209 |
| 8,953,785 B2 * | 2/2015 | Wolrich | ........... | H04L 9/0643 380/28 |
| 9,053,025 B2 * | 6/2015 | Ben-Kiki | ........... | G06F 11/0793 |
| 9,207,939 B2 * | 12/2015 | Hattori | ........... | G06F 9/30076 |
| 9,317,892 B2 * | 4/2016 | Veal | ........... | G11C 16/349 |
| 9,336,180 B2 * | 5/2016 | Ebersole | ........... | G06F 9/30076 |
| 9,747,218 B2 * | 8/2017 | Godard | ........... | G06F 12/0875 |
| 9,965,385 B2 * | 5/2018 | Solihin | ........... | G06F 12/0223 |
| 2003/0101334 A1 * | 5/2003 | Desoli | ........... | G06F 9/4484 712/227 |
| 2003/0210248 A1 * | 11/2003 | Wyatt | ........... | G06F 12/0888 345/541 |
| 2004/0008200 A1 * | 1/2004 | Naegle | ........... | G06F 9/461 345/505 |
| 2005/0104133 A1 * | 5/2005 | Kanno | ........... | G01R 31/318572 257/371 |
| 2006/0200802 A1 * | 9/2006 | Mott | ........... | G06F 9/544 717/120 |
| 2008/0052716 A1 * | 2/2008 | Theurer | ........... | G06F 9/4856 718/103 |
| 2009/0160867 A1 * | 6/2009 | Grossman | ........... | G06T 1/20 345/522 |
| 2010/0156888 A1 * | 6/2010 | Luk | ........... | G06T 1/20 345/418 |
| 2011/0072234 A1 * | 3/2011 | Chinya | ........... | G06F 12/1027 711/207 |
| 2011/0099551 A1 * | 4/2011 | Fahrig | ........... | G06F 9/5038 718/102 |
| 2013/0275728 A1 * | 10/2013 | Toll | ........... | G06F 9/3001 712/221 |
| 2014/0052968 A1 * | 2/2014 | Corbal | ........... | G06F 9/3001 712/222 |
| 2014/0052969 A1 * | 2/2014 | Corbal | ........... | G06F 9/30036 712/222 |
| 2014/0082328 A1 * | 3/2014 | Gopal | ........... | G06F 9/3001 712/208 |
| 2015/0193247 A1 * | 7/2015 | Dong | ........... | G06F 12/08 718/1 |
| 2015/0278091 A1 * | 10/2015 | Wilkerson | ........... | G11C 7/1072 711/105 |
| 2015/0378731 A1 | 12/2015 | Lai et al. | | |
| 2016/0274923 A1 * | 9/2016 | Harriman | ........... | G06F 1/3203 |
| 2017/0024632 A1 * | 1/2017 | Johnson | ........... | G06F 3/0604 |
| 2017/0076421 A1 * | 3/2017 | Hartog | ........... | G06F 9/4881 |
| 2018/0081817 A1 * | 3/2018 | Turner | ........... | G06F 12/0815 |

OTHER PUBLICATIONS

Parallel Radix Sort on the AMD Fusion Accelerated Processing Unit; Delorme et al.; 42nd International Conference on Parallel Processing; Oct. 1-4, 2018 (Year: 2018).*

MapCG: Writing parallel program portable between CPU and GPU; Hong et al.; 19th International Conference on Parallel Architectures and Compilation Techniques; Sep. 11-15, 2010 (Year: 2010).*

Algorithm for Cooperative CPU-GPU Computing; Aciu et al.; 15th International Symposium on Symbolic and Numeric Algorithms for Scientific Computing; Sep. 23-26, 2013 (Year: 2013).*

* cited by examiner

SYSTEM, APPARATUS AND METHOD FOR LOW OVERHEAD CONTROL TRANSFER TO ALTERNATE ADDRESS SPACE IN A PROCESSOR

TECHNICAL FIELD

Embodiments relate to processors, and more specifically to efficient address space switching.

BACKGROUND

In modern processors, typically one or more cores are provided, along with potentially other disparate circuitry such as dedicated processing units to perform various functions, generically referred to as accelerators. Oftentimes a processor is formed on one or more semiconductor die including one or more cores, one or more accelerators, internal cache memories, memory controller circuitry and so forth. In many instances, cores may execute from a virtual address space, where memory references are made using virtual addresses that are translated to physical addresses. Accelerators may execute from different address spaces. While such arrangement provides for suitable isolation, it creates complexities when code is to interact between such different address spaces.

DETAILED DESCRIPTION

Figure 1A:
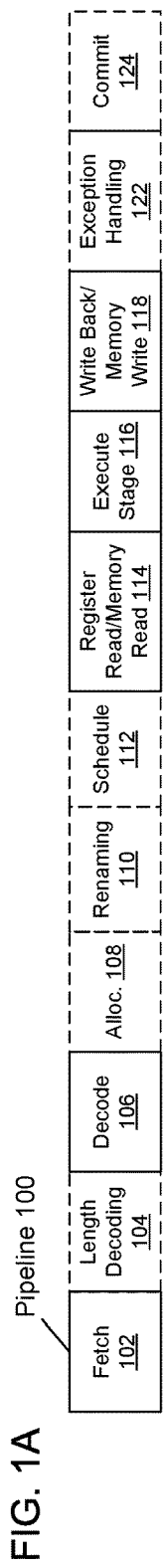
FIG. 1A is a block diagram illustrating an in-order pipeline and a register renaming stage, out-of-order issue/execution pipeline according to at least one embodiment of the invention.

In various embodiments, a processor can be controlled to dynamically and efficiently switch or jump operation from one address space to another address space, without the expense of a context switch or other heavyweight operations. Instead, as described herein based upon configuring an alternate address space configuration register (AASCR), which may be implemented as a machine specific register (MSR), an automatic jump to fetching code to be executed from an alternate space may occur.

More specifically as described herein, this alternate address space configuration register may be written to via a user-level write instruction to write desired values into this register, such that upon completion of the register write operation, instructions may be fetched directly from the indicated alternate address space, without any further overhead, context switch activities and so forth.

While embodiments may be implemented in many different processors, one particular embodiment may be implemented in a processor that includes one or a few number of cores, which may be, in some cases small relatively low power in-order cores. In addition to this one or more cores, the processor may include a plurality of accelerators, which may be implemented using a variety of hardware circuitry such as fixed function units, programmable control logic, field programmable gate arrays, digital signal processors or so forth to execute media processing high performance computing (HPC) and scientific computing processing, network processing or other dedicated tasks under control of the one or more cores, which may function as a main or host central processing unit (CPU) of the processor. However, understand the scope of the present invention is not limited in this regard and embodiments are applicable to a wide variety of different processor types.

As will described further herein to enable this efficient jump to code execution from an alternate address space, a pipeline of the processor may include selection circuitry, both at a front end and a back end, to enable a rapid switch to fetch instructions from an appropriate location, e.g., an alternate address space or a main core address space, which in an embodiment may be a virtual address space. Understand that in some cases such alternate address spaces may be implemented as flat addressing spaces, in that such address spaces may not use virtual address translation mechanisms. As used herein, understand that the term "alternate address space" means an address space that is distinguished and separate from a primary address space from which a core executes. In some cases, these different address spaces may be accessed using different amounts of bits. For example, a core address space may be accessed using somewhere between 36 and 48 bits, while an alternate address space associated with an accelerator may be accessed using a different number of bits, e.g., between 16 and 64 bits. Note that these alternate address spaces are not a common address space with a main core address space, although understand that these different address spaces may be located in a single memory device such as a main memory. In such instances, different pages or regions of the main memory may be associated with these different address spaces. In other cases, the alternate address spaces may be distributed across an entire system, even covering memory inside many accelerators with some holes or gaps in between them.

Figure 1B:
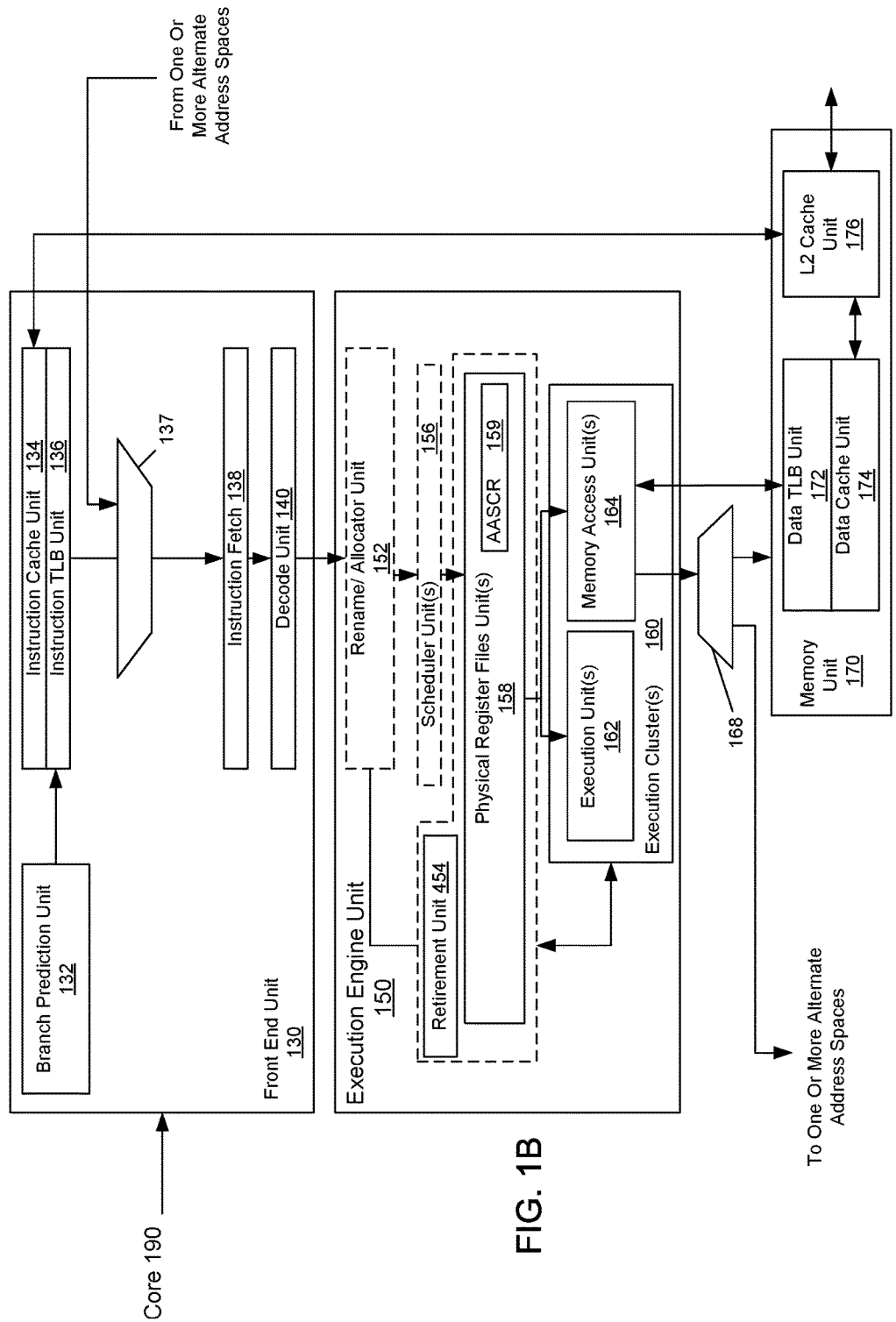
FIG. 1B is a block diagram illustrating an in-order architecture core and a register renaming logic, out-of-order issue/execution logic to be included in a processor according to at least one embodiment of the invention.

FIG. 1A is a block diagram illustrating an in-order pipeline and a register renaming stage, out-of-order issue/execution pipeline according to at least one embodiment of the invention. FIG. 1B is a block diagram illustrating an in-order architecture core and a register renaming logic, out-of-order issue/execution logic to be included in a processor according to at least one embodiment of the invention. The solid lined boxes in FIG. 1A illustrate the in-order pipeline, while the dashed lined boxes illustrates the register renaming, out-of-order issue/execution pipeline. Similarly, the solid lined boxes in FIG. 1B illustrate the in-order architecture logic, while the dashed lined boxes illustrates the register renaming logic and out-of-order issue/execution logic.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

In FIG. 1B, arrows denote a coupling between two or more units and the direction of the arrow indicates a direction of data flow between those units. FIG. 1B shows processor core 190 including a front end unit 130 coupled to an execution engine unit 150, and both are coupled to a memory unit 170.

The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140.

As further illustrated in FIG. 1B, to enable rapid and efficient switching between address spaces as described herein, a multiplexer 137 or other selection circuit may be provided. As seen, multiplexer 137 is configured to receive incoming instructions from the core address space, e.g., from instruction TLB unit 136, and receive incoming information from one or more alternate address spaces. As described herein, these alternate address spaces may be associated with one or more accelerators, either located on a single semiconductor die with core 190, within the same integrated circuit as core 190 or across multiple processor sockets. Thus when controlled, e.g., responsive to a configuration register write operation as also described herein, a fast jump to code execution from an accelerator's address space can be realized, even where these different address spaces may be located in different sockets, network locations or so forth. In this way, program execution can jump to another address space that is independent from a core program address space. In addition, using this technique to jump to alternate code in an alternate address space, legacy structures such as a TLB, page walk mechanisms and instruction cache usage (optionally) may be bypassed to reduce the latency of an instruction fetch path. While different types of code may be accessed in this manner, in one embodiment interrupt code may be efficiently accessed and executed with low latency via the techniques described herein. As a particular example, such interrupts may be associated with loading information into an accelerator to cause it to independently execute a specific task and then receiving result information from the accelerator (and vice versa).

Note that while the alternate address spaces are described as being associated with accelerators to generically refer to non-core components, embodiments are not limited in this regard. For example, in some embodiments for a heterogeneous processor, one or more first cores, e.g., of a first instruction set architecture (ISA) may be associated with a first address space and one or more second cores, e.g., of a second ISA may be associated with a second address space. It is possible for such one or more second cores to be configured as accelerator(s) under control of one or more of the first cores. Using the techniques described herein, cores of one address space can be controlled to efficiently jump to execution of one or more instructions of another address space.

Decode unit 140 or decoder may decode instructions, and generate as an output one or more micro-operations, microcode entry points, micro-instructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 134 is further coupled to a level 2 (L2) cache unit 176 in the memory unit 170. The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) unit(s) 158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 158 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc.

As further illustrated in FIG. 1B, physical register file(s) unit(s) 158 may include among its MSRs an alternate address space configuration register (AASCR) 159. This register can be programmed, e.g., by way of a write to MSR instruction, to store configuration information into this register that can be used to then jump at completion of execution of the write instruction to execution of code from a given alternate address space such as associated with a particular accelerator.

The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The L2 cache unit 176 is coupled to one or more other levels of cache and eventually to a main memory.

Still with reference to FIG. 1B, at a back end unit of core 190, another multiplexer 168 is provided to enable communication of, e.g., result information, from execution within core 190 to the appropriate address space location, e.g., the primary core address space associated with memory unit 170 or alternately to one or more alternate address spaces, e.g., under control of information in alternate address space configuration register 159.

With reference back to FIG. 1A, by way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.); or possible other ISAs.

It should be understood that the core 190 may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
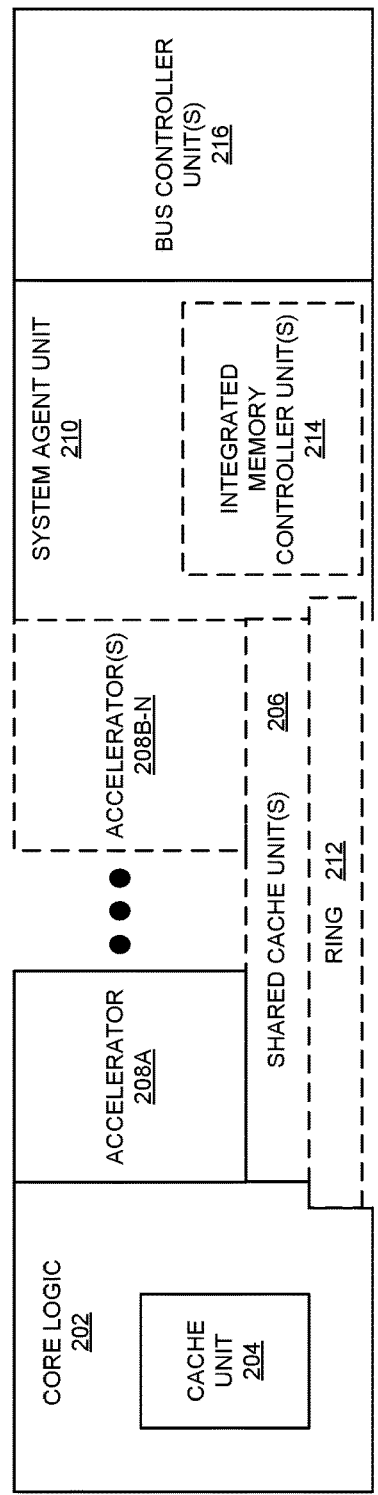
FIG. 2 is a block diagram of a processor with integrated memory controller and accelerator functionality according to embodiments.

FIG. 2 is a block diagram of a processor 200 with integrated memory controller and accelerator functionality according to embodiments. The solid lined boxes in FIG. 2 illustrate a processor 200 with a single core 202, a single accelerator 208A, a system agent unit 210, a set of one or more bus controller units 216, while the optional addition of the dashed lined boxes illustrates an alternative processor 200 with multiple accelerators 208B-N, and a set of one or more integrated memory controller unit(s) 214 in the system agent unit 210.

The memory hierarchy includes one or more levels of cache within the core 202 including a cache unit 204, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the accelerator(s) 208, the set of shared cache units 206, and the system agent unit 210, alternative embodiments may use any number of well-known techniques for interconnecting such units.

The system agent unit 210 includes those components coordinating and operating core 202 and accelerator(s) 208A-N. The system agent unit 210 may include for example a power control unit (PCU) and a display unit (not shown). The PCU may be or include logic and components needed for regulating the power state of the core 202 and accelerator(s) 208A-N. The display unit is for driving one or more externally connected displays.

While a single core embodiment is shown for ease of illustration understand that multiple cores may be present. Such cores may be homogenous or heterogeneous in terms of architecture and/or instruction set. For example, some of the cores may be in order while others are out-of-order. As another example, two or more of the cores may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 200 may be a part of and/or may be implemented on one or more substrates using any of a number of process technologies, such as, for example, BiCMOS, CMOS, or NMOS.

Figure 3:
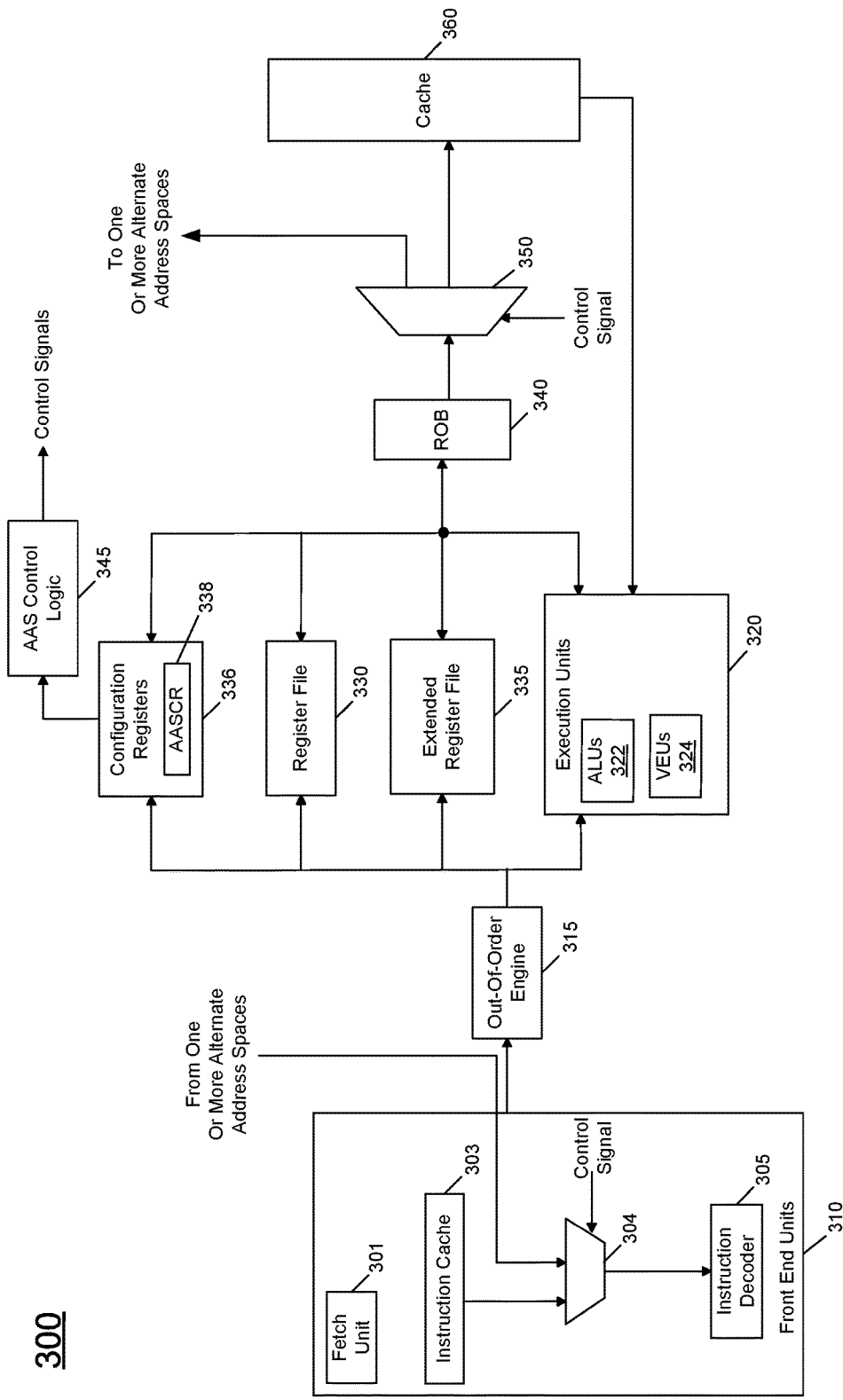
FIG. 3 is a block diagram of a micro-architecture of a processor core in accordance with one embodiment of the present invention.

Referring now to FIG. 3, shown is a block diagram of a micro-architecture of a processor core in accordance with one embodiment of the present invention. As shown in FIG. 3, processor core 300 may be a multi-stage pipelined out-of-order processor.

As seen in FIG. 3, core 300 includes front end units 310, which may be used to fetch instructions to be executed and prepare them for use later in the processor pipeline. For example, front end units 310 may include a fetch unit 301, an instruction cache 303, and an instruction decoder 305. In some implementations, front end units 310 may further include a trace cache, along with microcode storage as well as a micro-operation storage.

As further illustrated in FIG. 3, a front end multiplexer 304 or other selection circuit may couple between instruction cache 303 and decoder 305 to programmably select from where to obtain instructions. More specifically, in embodiments instructions may be received from a core address space, e.g., a conventional virtual address space in which core 300 executes and/or from one or more alternate address spaces. As described herein, in some embodiments each of multiple such alternate address spaces may be associated with a given accelerator that may perform operations under control by core 300. Fetch unit 301 may fetch macro-instructions, e.g., from memory or instruction cache 303, and feed them to instruction decoder 305 via multiplexer 304 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

As further illustrated in FIG. 3, core 300 also includes a set of configuration registers 336, which may include various configuration registers to configure modes of operation and execution within core 300. In addition, such configuration registers may include one or more MSRs, including an alternate address space configuration register 338 as described herein.

Various resources may be present in execution units 320, including, for example, various integer, floating point, and single instruction multiple data (SIMD) logic units, among other specialized hardware. For example, such execution units may include one or more arithmetic logic units (ALUs) 322 and one or more vector execution units 324, among other such execution units.

Results from the execution units may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 3, ROB 340 is coupled to a cache 360 which, in one embodiment may be a low level cache (e.g., an L1 cache) although the scope of the present invention is not limited in this regard. More specifically, a back end multiplexer 350 or other selection circuit may couple between ROB 340 and cache 360 to be programmatically controlled to output instruction results either to cache 360 or to one or more alternate address spaces as described herein.

As further shown in FIG. 3, execution units 320 can be directly coupled to cache 360. From cache 360, data communication may occur with higher level caches, system memory and so forth. While shown with this high level in the embodiment of FIG. 3, understand the scope of the present invention is not limited in this regard. For example, while the implementation of FIG. 3 is with regard to an out-of-order machine such as of an Intel® x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

In response to a write to MSR instruction to AASCR 338, appropriate values can be set. Based at least in part on these configuration values, code flow can be controlled to dynamically and efficiently jump to a different address space, e.g., associated with a given accelerator. Further as shown, an alternate address space control logic 345 is coupled to access the information in configuration register 338 and based thereon to provide control signals to control multiplexers or other selection circuits within core 300. More specifically, these control signals output by control logic 345 may be used to control front end multiplexer 304 that, in response to such control signals, provides instructions to instruction decoder 305 from one of instruction cache 303 or an alternate address space. Similarly, at a back end unit of core 300, multiplexer 350 can dynamically control retirement results to be provided to a selected one of cache memory 360 associated with a core address space or to a given one of one or more alternate address spaces.

Figure 4:
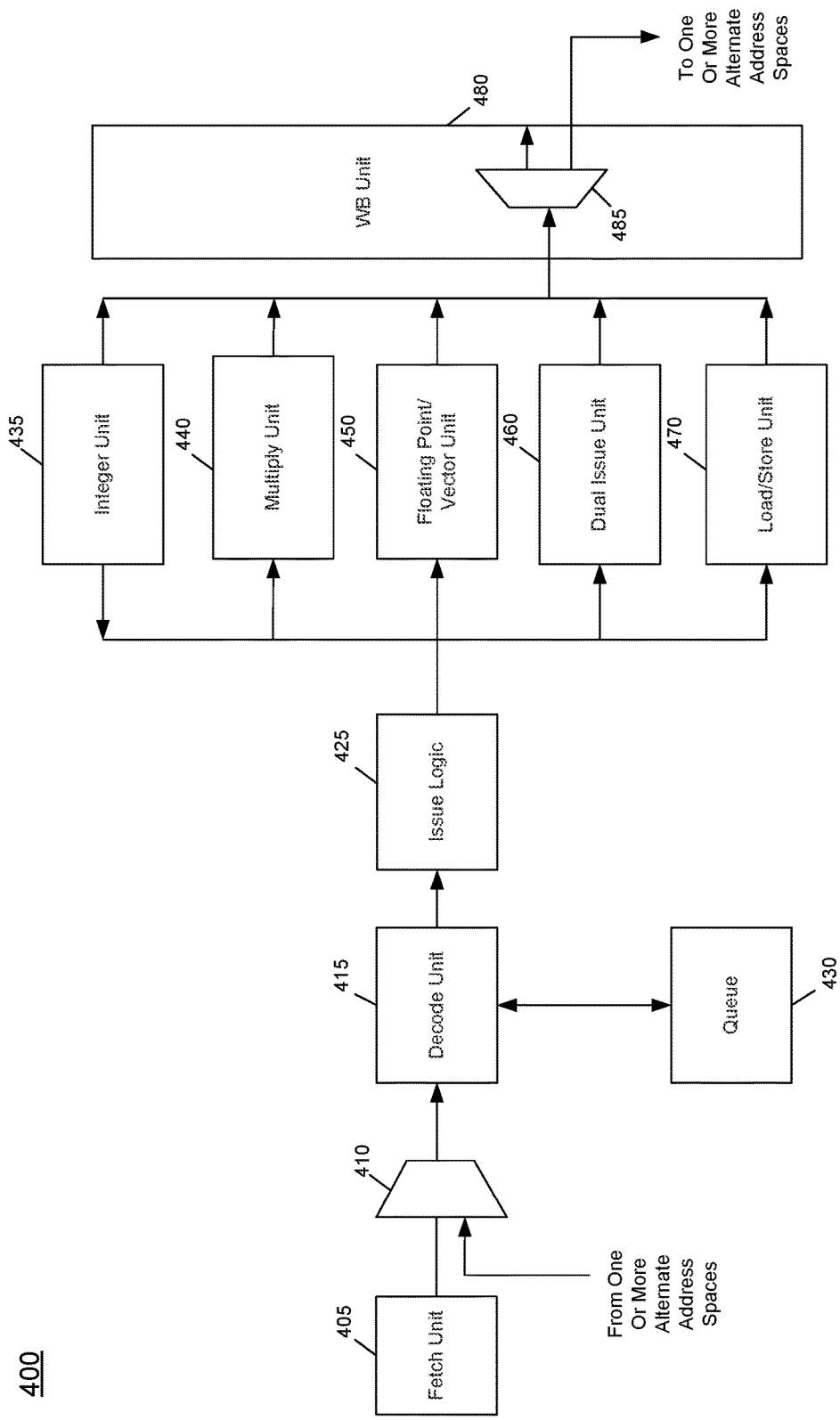
FIG. 4 is a block diagram of a micro-architecture of a processor core in accordance with yet another embodiment.

Referring to FIG. 4, shown is a block diagram of a micro-architecture of a processor core in accordance with yet another embodiment. As illustrated in FIG. 4, a core 400 may include a multi-staged in-order pipeline to execute at very low power consumption levels. As one such example, processor 400 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 400 includes a fetch unit 405 that is configured to fetch instructions and provide them to a decode unit 415, which may decode the instructions, e.g., macro-instructions of a given ISA such as an ARMv8 ISA. As further illustrated in FIG. 4, a multiplexer 410 or other selection circuit may be interposed between fetch unit 405 and decode unit 415, and controlled to provide instructions to decode unit 415 from a given one of fetch unit 405 or from an instruction stream received from an alternate address space. Note further that a queue 430 may couple to decode unit 415 to store decoded instructions. Decoded instructions are provided to an issue logic 425, where the decoded instructions may be issued to a given one of multiple execution units.

With further reference to FIG. 4, issue logic 425 may issue instructions to one of multiple execution units. In the embodiment shown, these execution units include an integer unit 435, a multiply unit 440, a floating point/vector unit 450, a dual issue unit 460, and a load/store unit 470. The results of these different execution units may be provided to a writeback unit 480. Understand that while a single writeback unit is shown for ease of illustration, in some implementations separate writeback units may be associated with each of the execution units. Also shown within writeback unit 480 is an output multiplexer 485, which may be controlled to provide result data to a primary core address space or to one or more alternate address spaces as described herein.

Furthermore, understand that while each of the units and logic shown in FIG. 4 is represented at a high level, a particular implementation may include more or different structures. In other cases, core 400 may include a multi-stage multi-issue out-of-order pipeline to execute at very high performance levels, using a microarchitecture in accordance with an ARM Cortex A57 design. A processor designed using one or more cores having a pipeline as in FIG. 4 may be implemented in many different end products, extending from mobile devices to server systems.

Figure 5:
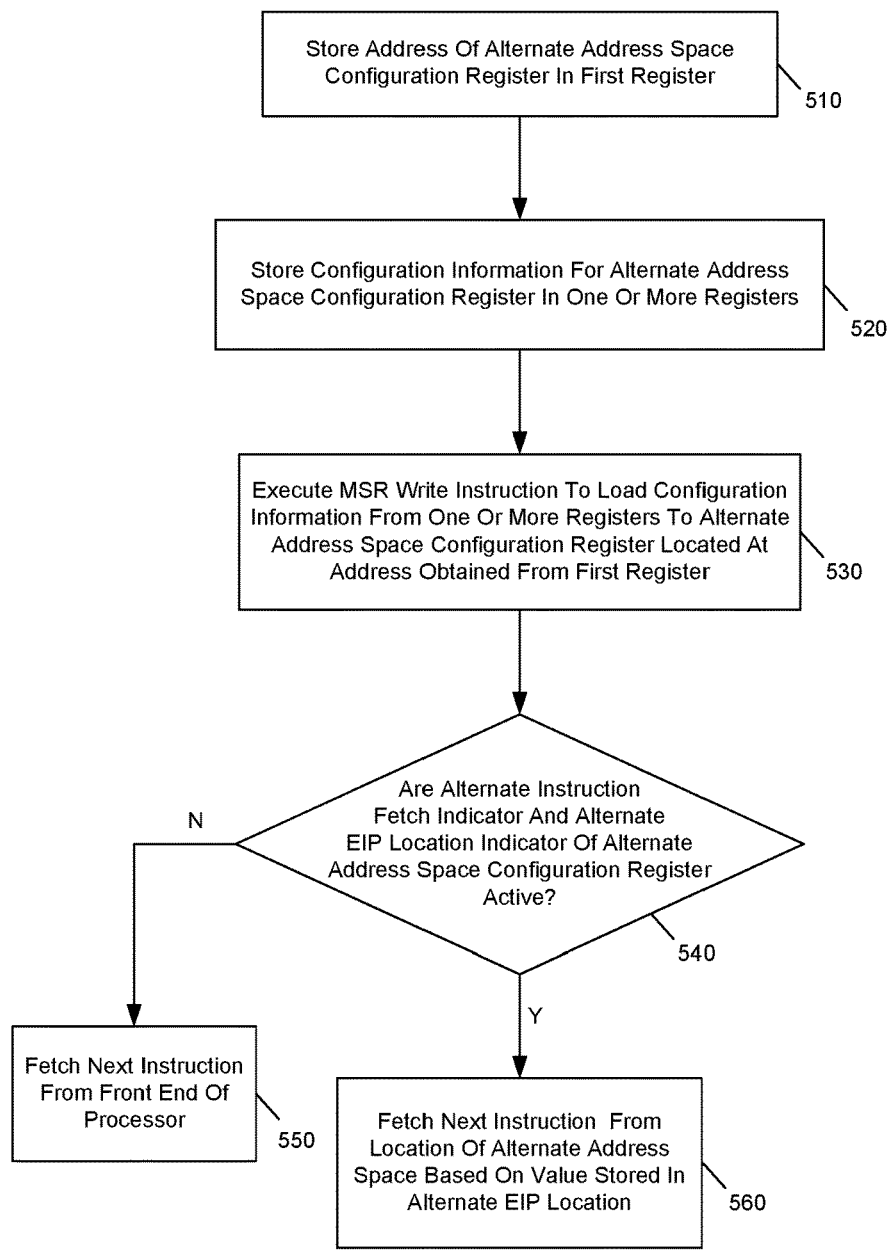
FIG. 5 is a flow diagram of a method in accordance with an embodiment of the present invention.

Referring now to FIG. 5, shown is a flow diagram of a method in accordance with an embodiment of the present invention. More specifically, method 500 shown in FIG. 5 is a method for controlling pipeline operation to quickly and efficiently jump control of execution from one address space, e.g., a primary or virtual address space, to an alternate address space, such as an address space associated with a given accelerator. In various embodiments, method 500 may be performed by hardware circuitry, software and/or firmware or combinations thereof. For example, at least portions of method 500 may be executed by control logic such as an alternate address space control logic, as well as processor microcode configured to execute instructions such as a write to MSR instruction.

As seen, method 500 begins by storing an address of an alternate address space configuration register within a first register (block 510). For example, a memory mapped input/output (IO) address may be used to address this configuration register or the configuration register may be located at an unused address within a core. Control next passes to block 520 where configuration information for this alternate address space configuration register may be stored in one or more registers. For example, with reference to the code segment of Table 2 below, appropriate values can be written to a given general-purpose register, e.g., one or more of an EAX and an EDX register, to store this configuration information. Thereafter, control passes to block 530 where a write to MSR instruction may be executed. More specifically, this instruction may specify the address for the alternate address space configuration register and as such may store the configuration information from the one or more general-purpose registers into this configuration register. Note at this point configuration of the alternate address space configuration register is set. This information may be used, at a conclusion of the microcode execution of this write instruction, to jump to code execution within this address space.

Thus as illustrated in FIG. 5, if it is determined at block 540 that the alternate instruction fetch indicator and alternate extended instruction; pointer (EIP) location indicator are enabled (e.g., as determined by reading bits 10 and 11 of the alternate address space configuration register shown in Table 1) a jump to code execution from the alternate address space occurs. As such, control passes to block 560 where the next instruction may be fetched from the location of the alternate address space based on the value stored within the alternate next EIP location, e.g., a given register (in one embodiment, the RDX register). If instead it is determined that these two bits are not enabled, control passes to block 550 where the next instruction of a conventional core address space may be fetched from a front end unit of the processor, e.g., using conventional page tables and TLBs. Understand while the determination at diamond 540 is based on both indicators being enabled, in other embodiments it may be possible that these indicators may be independently controlled. Also understand while shown at this high level in the embodiment of FIG. 5, many variations and alternatives are possible.

Referring now to Table 1 below, shown is an example representation of fields present in a configuration register in accordance with an embodiment and their descriptions. While shown with this particular implementation in Table 1, understand the scope of the present invention is not limited in this regard.

TABLE 1

| Field Name | Bit number | Description |
|---|---|---|
| FLAT_ADDR_D | 0 | Enable flat addressing mode for the data interface with the Accelerator (no TLB: linear address = physical address for data) |
| ADDR_SIZE64_D | 1 | Enable 64 bit addressing mode for the data interface with the Accelerator (disables canonical address checking for 48 bit addresses. This change does not affect the tag size in the data cache, since the cache is disabled during this mode) |
| FLAT_ADDR_I | 2 | Enable flat addressing mode for the instruction cache (no TLB: linear address = physical address for instructions) |
| ADDR_SIZE64_i | 3 | Enable 64 bit mode for the I-Cache interface |
| ENABLE_LOAD_FROM_ACCELERATOR | 4 | Enable load path from Accelerator to Core (Turns off load from L2 cache) |
| ENABLE_STORE_TO_ACCELERATOR | 5 | Enable store path from Core to Accelerator. (Turns off store to L2 cache) |

TABLE 1-continued

| Field Name | Bit number | Description |
| --- | --- | --- |
| TAG | 9:6 | Tag can be used by software for any reason. |
| ENABLE_FETCH_FROM_ACCELERATOR | 10 | Enable Instruction Fetch from Accelerator |
| ENABLE_EIP_FROM_RDX | 11 | Assign next EIP to the value in RDX and jump to this address when exiting the WRMSR |

Referring now to Table 2, shown is an example pseudo-code segment illustrating various instructions to load configuration information into general-purpose registers and to write such values into a configuration register, to enable an efficient switch of instruction fetch from one address space to an alternate address space at a conclusion of the write instruction. While specific representative code is shown in Table 2, understand that many variations and alternatives are possible.

TABLE 2

| | | |
| --- | --- | --- |
| mov | ECX, 0x100 | 0x100 is the address of an AASCR |
| mov | EAX, 000000041H | value to write into the control register |
| mov | EDX, 000000000H | used only for "fetch_from_ Accelerator" and "EIP_from_RDX" mode bits |
| wrmsr | ECX | Write to Machine Specific Register |

With this set of instructions shown in the pseudo-code of Table 2, initialization operations are performed and then the write to MSR instruction enables these initialized configuration values to be stored into the alternate address space configuration register. With appropriate enabling of, e.g., bits 10 and 11 shown in Table 1 above, a jump to the value stored in an alternate EIP location (e.g., a general-purpose register such as the RDX register) may provide an indication of an address of the next instruction to be obtained from the alternate address space at the conclusion of the microcode execution of the write to MSR instruction. Of course to effect this operation, prior to the pseudo-code shown in Table 2, an address of the location in the alternate address space may first be written to this RDX register.

Figure 6:
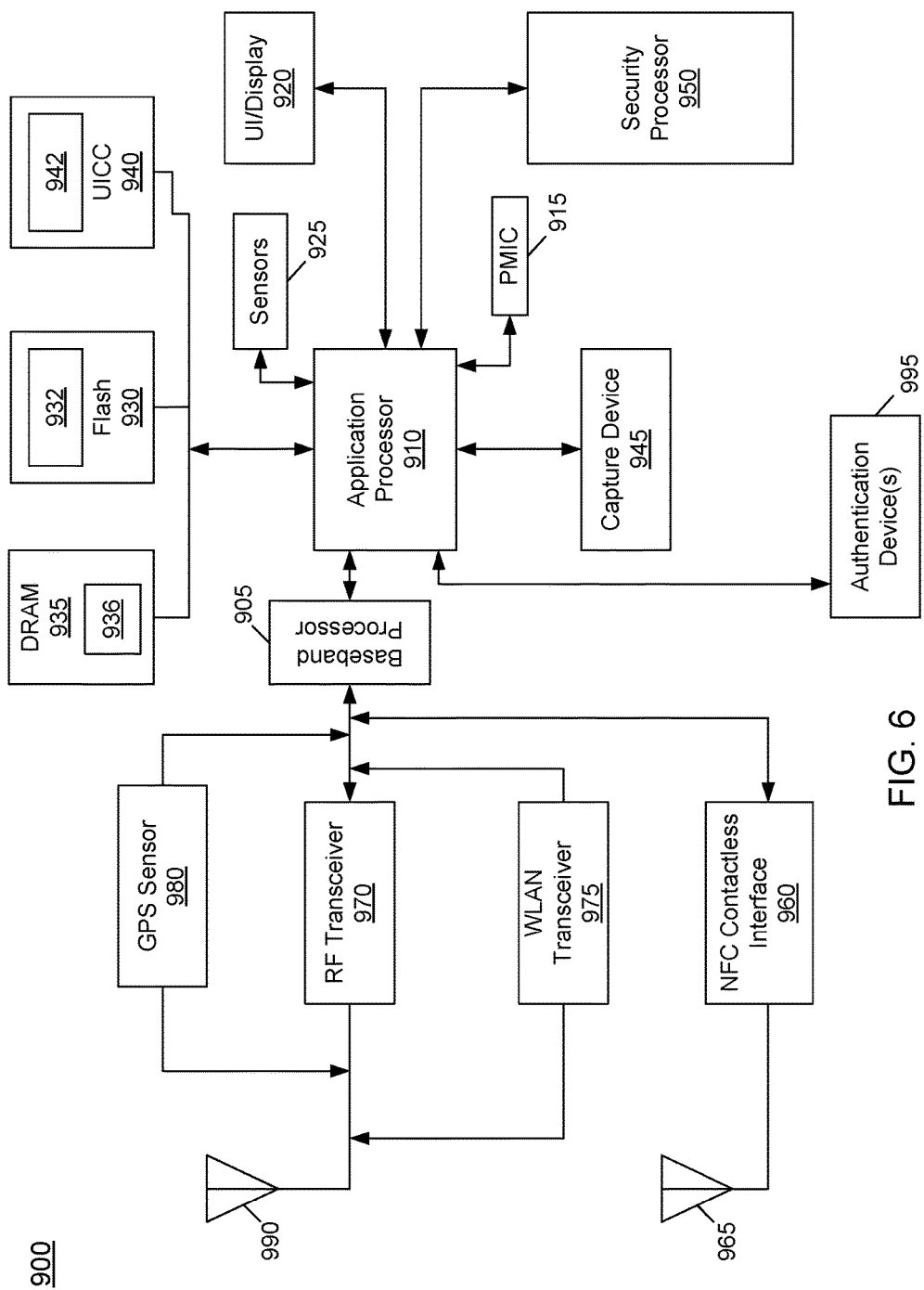
FIG. 6 is a block diagram of an example system with which embodiments can be used.

Referring now to FIG. 6, shown is a block diagram of an example system with which embodiments can be used. As seen, system 900 may be a smartphone or other wireless communicator or any other Internet of Things (IoT) device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In different embodiments, application processor 910 may include control logic to dynamically jump to code stored in one or more alternate address spaces, as described herein. In some embodiments, flash memory 930 and/or DRAM 935 may include one or more alternate address spaces 932/936, which may be associated with one or more accelerators or other non-core circuitry. As further seen, application processor 910 also couples to a capture device 945 such as one or more image capture devices that can record video and/or still images.

Still referring to FIG. 6, a universal integrated circuit card (UICC) 940 comprises a subscriber identity module, which in some embodiments includes a secure storage 942 to store secure user information. System 900 may further include a security processor 950 that may implement a trusted executed environment (TEE), and which may couple to application processor 910.

A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations. As further illustrated, a near field communication (NFC) contactless interface 960 is provided that communicates in a NFC near field via an NFC antenna 965. While separate antennae are shown in FIG. 6, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more wireless networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 7:
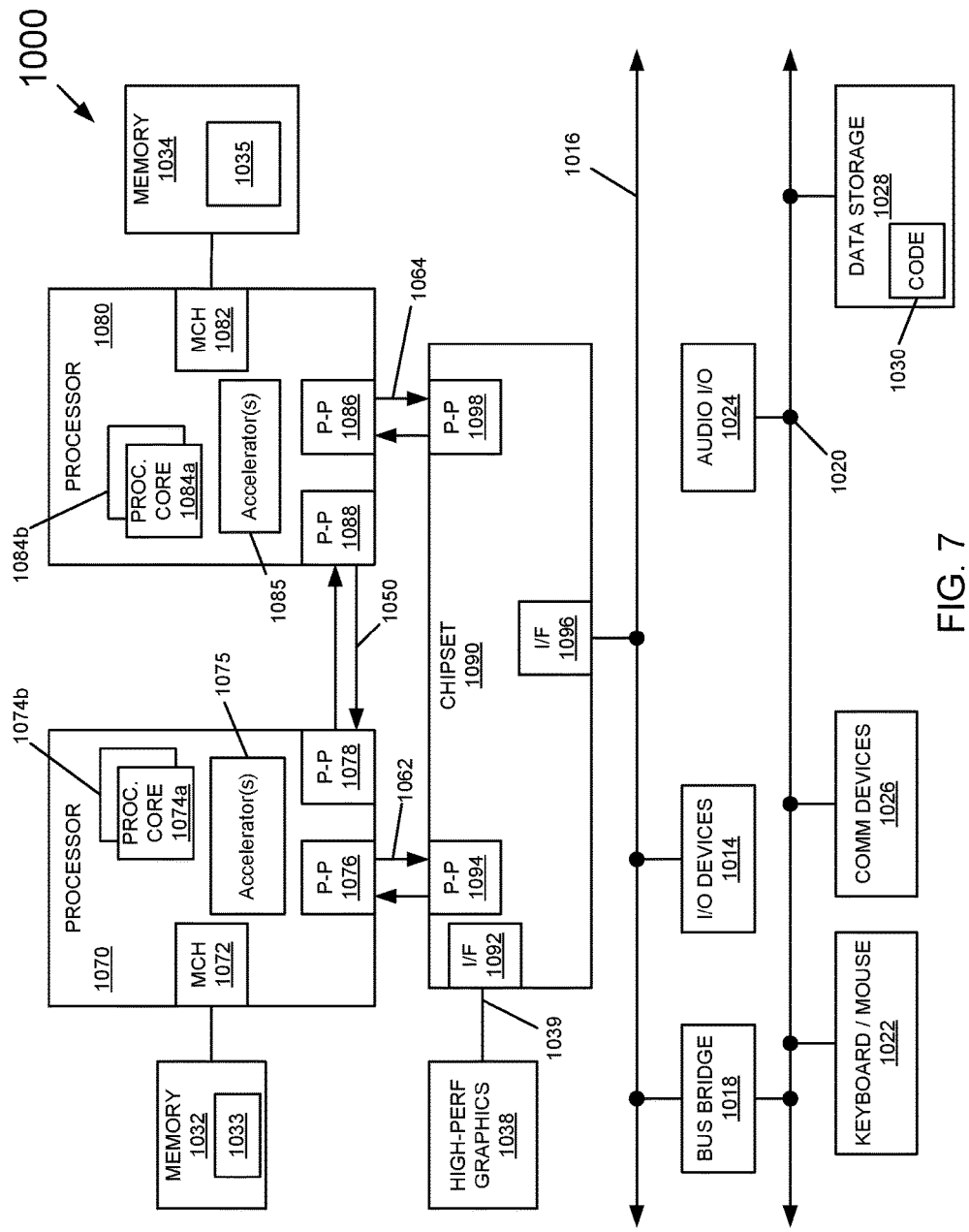
FIG. 7 is a block diagram of a system in accordance with another embodiment of the present invention.

Referring now to FIG. 7, shown is a block diagram of a system in accordance with another embodiment of the present invention. As shown in FIG. 7, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include one or more accelerators 1075 and 1085 to perform specific operations under control of the processor cores, and which may access alternate address spaces, as described herein.

Still referring to FIG. 7, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 7, MCH's 1072 and 1082 couple the processors to respective memories, namely a memory 1032 and a memory 1034, which may be portions of main memory (e.g., a DRAM) locally attached to the respective processors. As illustrated, memories 1032, 1034 each include one or more execute-only regions 1033, 1035 to be provisioned for use in secure communication between applications. First processor 1070 and second processor 1080 may be coupled to a chipset 1090 via P-P interconnects 1052 and 1054, respectively. As shown in FIG. 7, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 7, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 8:
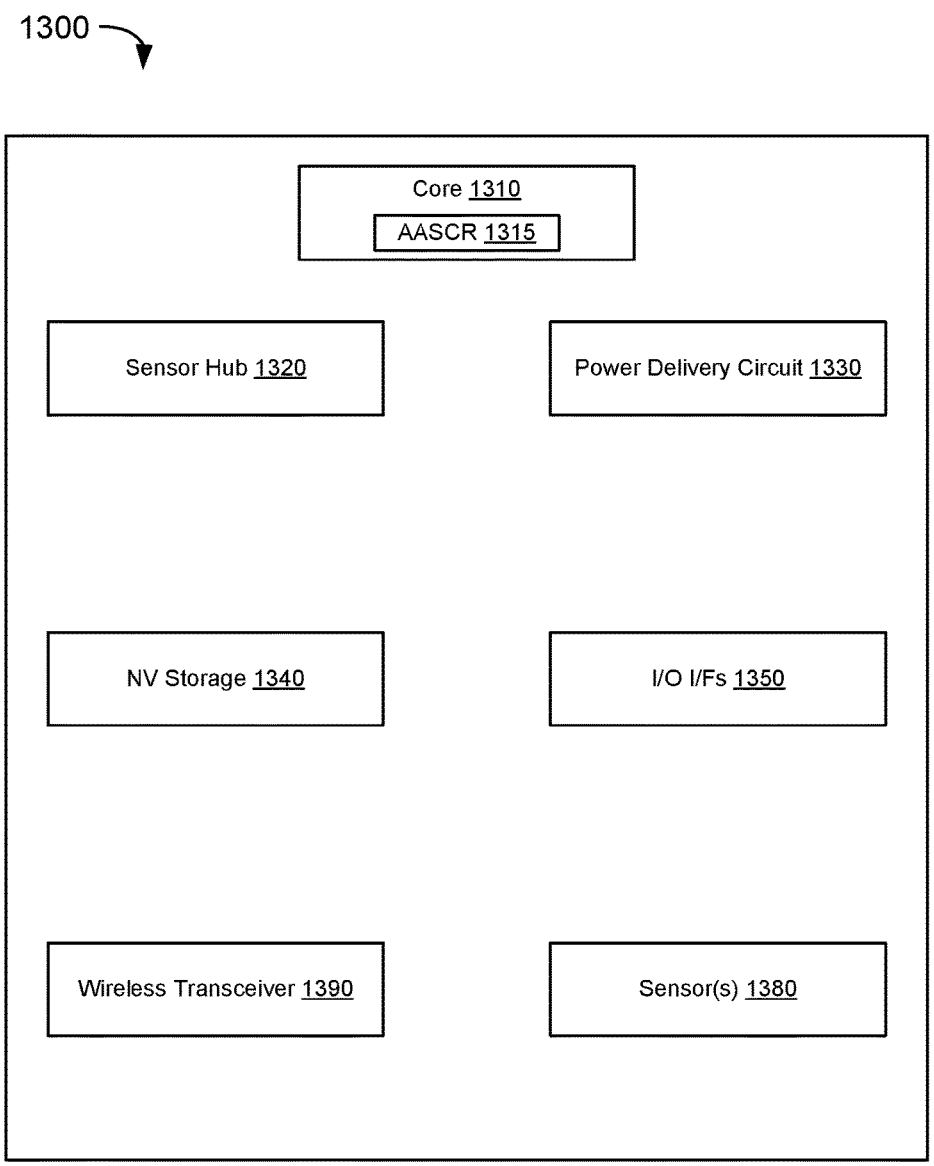
FIG. 8 is a block diagram of a wearable module in accordance with another embodiment.

Embodiments may be used in Internet of Things (IoT) devices such as wearable devices or other small form factor IoT devices. Referring now to FIG. 8, shown is a block diagram of a wearable module in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. Core 1310 couples to various components including a sensor hub 1320, which may be configured to interact with a plurality of sensors 1380, such as one or more biometric, motion environmental, thermal, and/or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein.

As further illustrated in FIG. 8, core 1310 may include an alternate address space control logic 1315 as described herein. In some embodiments, this control logic may be implemented within general-purpose circuitry of core 1310. Via this control logic, core 1310 may efficiently jump to different address spaces, such as associated with one or more sensors 1380 or on-die circuitry such as accelerators, as described herein.

The following examples pertain to further embodiments.

In one example, a processor includes: an accelerator to execute instructions, the accelerator associated with a first address space; a core coupled to the accelerator, the core associated with a second address space and including an alternate address space configuration register to store configuration information to enable the core to execute instructions from the first address space, the alternate address space configuration register having a first field to store a first enable indicator to indicate that the core is to fetch a next instruction from the first address space; and a control logic to configure the core based in part on the first enable indicator.

In an example, the core further comprises a first selection circuit having a first input port to receive a first instruction stream from the first address space and a second input port to receive a second instruction stream from the second address space, where the control logic is to cause the first selection circuit to provide the next instruction from the first input port based at least in part on the first enable indicator.

In an example, the alternate address space configuration register further comprises a second field to store a second enable indicator to indicate that an address of the next instruction from the first address space is to be obtained from a first register of the core.

In an example, the control logic, in response to a write instruction, is to write the configuration information into the alternate address space configuration register, and after the execution of the write instruction to cause a next instruction pointer to point to an address stored in the first register.

In an example, the alternate address space configuration register further comprises a third field to store a third enable indicator to enable a flat addressing mode for the first address space.

In an example, the control logic is to disable a translation lookaside buffer of the core based on the third enable indicator.

In an example, the core further comprises a second selection circuit to receive an output of a retirement unit, the second selection circuit having a first output port to couple to a cache memory of the core and a second output port to couple to a storage of the first address space.

In an example, the control logic is to control the second selection circuit to provide the output of the retirement unit to the storage of the first address space via the second output port based at least in part on another enable indicator stored in another field of the alternate address space configuration register.

In another example, a method comprises: executing a first write instruction to load configuration information from one or more registers into a first configuration register of a core, the first configuration register comprising an alternate address space configuration register; after executing the first write instruction, determining whether an alternate instruction fetch indicator of the first configuration register is active; and responsive to determining that the alternate instruction fetch indicator is active, fetching a next instruction from an address space associated with an accelerator coupled to the core, the address space separate from a core address space of the core.

In an example, the method further comprises determining whether an alternate instruction pointer location indicator of the first configuration register is active, and responsive to determining that the alternate instruction pointer location indicator is active, fetching the next instruction from an address stored in an instruction pointer of the core.

In an example, the method further comprises responsive to determining that the alternate instruction fetch indicator is not active, fetching another instruction from a front end unit of the core.

In an example, the method further comprises: storing an address of the first configuration register in a first register of the core; and storing the configuration information in one or more second registers of the core.

In an example, the first write instruction comprises a write to MSR instruction having a first identifier corresponding to the first register to specify a location of the first configuration register.

In an example, executing the write to MSR instruction comprises accessing the one or more second registers to obtain the configuration information, the one or more second registers implicit registers of the write to MSR instruction.

In an example, the method further comprises executing the write to MSR instruction in a non-privileged mode.

In an example, the method further comprises: configuring a front end selection unit of the core to provide the next instruction from the address space associated with the accelerator to a decode unit of the core; and configuring a back end unit selection unit of the core to provide a result of the next instruction to the address space associated with the accelerator.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a processor and a system memory. The processor may have at least one core associated with a core address space and at least one accelerator associated with a second address space. The at least at one core may comprise: a configuration storage to store configuration information to enable the at least one core to fetch one or more instructions from the second address space; a control logic to configure the configuration storage; a front end unit including a fetch logic, a first selection circuit and an instruction decoder, where the control logic is to control the first selection circuit to provide to the instruction decoder first instructions from the fetch logic or second instructions from the second address space; one or more execution units to execute instructions; and a back end unit including a retirement logic and a second selection circuit, where the control logic is to control the second selection circuit to provide result information to a first storage of the core address space or to a second storage of the second address space. The system memory may be coupled to the processor and may comprise the core address space and the second address space.

In an example, the first selection circuit comprises a first input port to receive the first instructions from the fetch logic and a second input port to receive the second instructions from the second address space, where the control logic is to control the first selection circuit based on at least some of the configuration information.

In an example, the configuration storage comprises: a first field to store a first enable indicator to indicate that the at least one core is to fetch a next instruction from the second address space; a second field to store a second enable indicator to indicate that an address of the next instruction from the second address space is to be obtained from a first register of the at least core; and a third field to store a third enable indicator to indicate that a result of the next instruction is to be provided to the second address space.

In an example, the at least one accelerator comprises a core having a different instruction set architecture than the at least one core.

In another example, an apparatus comprises: accelerator means for executing instructions, the accelerator means associated with a first address space; core means coupled to the accelerator means and associated with a second address space and including an alternate address space configuration storage means for storing configuration information to enable the core means to execute instructions from the first address space, the alternate address space configuration storage means having a first field to store a first enable indicator to indicate that the core means is to fetch a next instruction from the first address space; and control means for configuring the core means based in part on the first enable indicator.

In an example, the core means further comprises a first selection means having a first input port to receive a first instruction stream from the first address space and a second input port to receive a second instruction stream from the second address space, where the control means is to cause the first selection means to provide the next instruction from the first input port based at least in part on the first enable indicator.

In an example, the alternate address space configuration storage means further comprises a second field to store a second enable indicator to indicate that an address of the next instruction from the first address space is to be obtained from a first register means of the core means.

In an example, the control means, in response to a write instruction, is to write the configuration information into the alternate address space configuration storage means, and after the execution of the write instruction to cause a next instruction pointer to point to an address stored in the first register means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or machine readable media including instructions that in response to being executed on a computing device, cause the device to carry out the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by one machine, causes the one machine to fabricate one integrated circuit to perform operations. Still further embodiments may be implemented in a computer readable storage medium including information that, when manufactured into a SoC or other processor, is to configure the SoC or other processor to perform operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
an accelerator to execute instructions, the accelerator associated with a first address space;
a core coupled to the accelerator, the core associated with a second address space and including an alternate address space configuration register to store configuration information to enable the core to execute instructions from the first address space, the alternate address space configuration register having a first field to store a first enable indicator to indicate that the core is to fetch a next instruction from the first address space, wherein the core is to execute a write instruction to store configuration information in the alternate address space configuration register and to thereafter jump to execution of code from the second address space; and
a control logic to configure the core based in part on the first enable indicator.

2. A processor comprising:
an accelerator to execute instructions, the accelerator associated with a first address space;
a core coupled to the accelerator, the core associated with a second address space and including an alternate address space configuration register to store configuration information to enable the core to execute instructions from the first address space, the alternate address space configuration register having a first field to store a first enable indicator to indicate that the core is to fetch a next instruction from the first address space;
a control logic to configure the core based in part on the first enable indicator; and
a first selection circuit having a first input port to receive a first instruction stream from the first address space and a second input port to receive a second instruction stream from the second address space, wherein the control logic is to cause the first selection circuit to provide the next instruction from the first input port based at least in part on the first enable indicator.

3. The processor of claim 1, wherein the alternate address space configuration register further comprises a second field to store a second enable indicator to indicate that an address of the next instruction from the first address space is to be obtained from a first register of the core.

4. The processor of claim 3, wherein the control logic, in response to a write instruction, is to write the configuration information into the alternate address space configuration register, and after the execution of the write instruction to cause a next instruction pointer to point to an address stored in the first register.

5. The processor of claim 1, wherein the alternate address space configuration register further comprises a third field to store a third enable indicator to enable a flat addressing mode for the first address space.

6. The processor of claim 5, wherein the control logic is to disable a translation lookaside buffer of the core based on the third enable indicator.

7. A processor comprising:
an accelerator to execute instructions, the accelerator associated with a first address space;
a core coupled to the accelerator, the core associated with a second address space and including an alternate address space configuration register to store configuration information to enable the core to execute instructions from the first address space, the alternate address space configuration register having a first field to store a first enable indicator to indicate that the core is to fetch a next instruction from the first address space;
a control logic to configure the core based in part on the first enable indicator; and
a selection circuit to receive an output of a retirement unit, the selection circuit having a first output port to couple to a cache memory of the core and a second output port to couple to a storage of the first address space.

8. The processor of claim 7, wherein the control logic is to control the selection circuit to provide the output of the retirement unit to the storage of the first address space via the second output port based at least in part on another enable indicator stored in another field of the alternate address space configuration register.

9. The processor of claim 1, further comprising a semiconductor die comprising the accelerator and the core.

10. The processor of claim 9, wherein the core is of a first instruction set architecture (ISA) and the accelerator comprises a core of a second ISA.

11. The processor of claim 2, further comprising a second selection circuit to receive an output of a retirement unit, the second selection circuit having a first output port to couple to a cache memory of the core and a second output port to couple to a storage of the first address space.

12. The processor of claim 2, wherein the core is to execute a write instruction to store configuration information in the alternate address space configuration register and to thereafter jump to execution of code from the second address space.

13. The processor of claim 2, further comprising a semiconductor die comprising the accelerator and the core.

14. The processor of claim 13, wherein the core is of a first instruction set architecture (ISA) and the accelerator comprises a core of a second ISA.

15. The processor of claim 7, further comprising a semiconductor die comprising the accelerator and the core.

16. The processor of claim 15, wherein the core is of a first instruction set architecture (ISA) and the accelerator comprises a core of a second ISA.

* * * * *